E. A. NELSON.
GASKET AND METHOD OF MAKING SAME.
APPLICATION FILED JULY 19, 1918.

1,430,103.

Patented Sept. 26, 1922.

Inventor
Emil A. Nelson

Witness
Anna M. Dorr.
Chas. W. Stauffiger

By

Attorney

Patented Sept. 26, 1922.

1,430,103

UNITED STATES PATENT OFFICE.

EMIL A. NELSON, OF DETROIT, MICHIGAN, ASSIGNOR, BY MESNE ASSIGNMENTS, TO ARTHUR H. MURRAY, OF DETROIT, MICHIGAN.

GASKET AND METHOD OF MAKING SAME.

Application filed July 19, 1918. Serial No. 245,738.

*To all whom it may concern:*

Be it known that I, EMIL A. NELSON, a citizen of the United States of America, residing at Detroit, in the county of Wayne and State of Michigan, have invented certain new and useful Improvements in Gaskets and Methods of Making Same, of which the following is a specification, reference being had therein to the accompanying drawings.

Gaskets, particularly those used between an engine cylinder block and head, as now manufactured from paper, paperoid, fiber, asbestos or a combination of either within some constructions, wire gauze or an interwoven metallic reinforcement, will not withstand rough handling and unless very carefuly removed cannot be used more than once. This is, in part, due to the thin fragile material used, and to the fact that certain portions of the gasket, particularly between cylinders and ports are very narrow. When compressed by being clamped between a cylinder head and a cylinder block these narrow portions do not always have sufficient body to withstand the pressure and may become so disintegrated or frayed and broken along the edges as to cause leakage.

The object of this invention is to remedy the defects common to present well known constructions by providing a body or form for the gasket which will have sufficient rigidity and strength to withstand rough usage and give sufficient body and strength to the whole structure to prevent the same from being crushed, torn or disintegrated in use, preventing leakage and giving such strength that the gasket may be removed and used over and over again. A further object is to provide a construction which is such that it may be manufactured by a new method or process, thus greatly lessening the cost of manufacture, and which process lends itself to the use of various kinds of material which could not be used heretofore with efficiency due to the fragile nature of the material.

With these and other ends in view, the invention resides in the matters hereinafter more fully set forth and particularly pointed out in the appended claims, reference being had to the accompanying drawings in which I have illustrated the invention as being applicable to a cylinder block gasket, but it is to be understood that gaskets, washers, and fillers for various purposes may be constructed in accordance with my invention.

Figure 1:
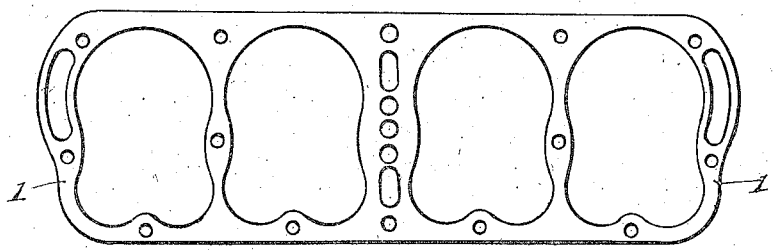
Figure 1 is a plan of a conventional form of gasket having comparatively narrow or neck portions.
Figure 2:
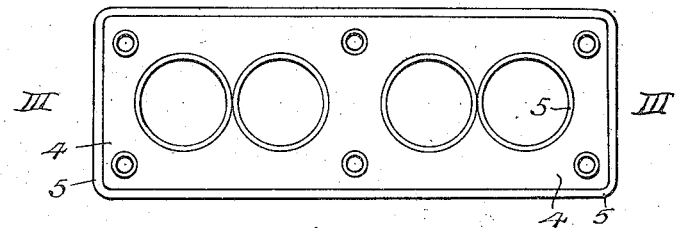
Fig. 2 is a plan of another form of gasket made in accordance with my invention.

In the drawing, I have shown cylinder head gaskets as best illustrative of a use to which my invention is particularly adapted, and each structure is shown as provided with a metallic body 1, preferably cut or stamped from sheet metal with openings corresponding to the necessary cylinder openings, ports, water passages and bolt holes of the cylinder block and head (not shown) of the particular engine to which the gasket is to be applied.

Figure 3:
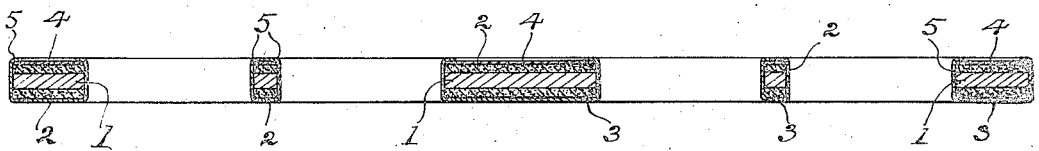
Fig. 3 is an enlarged longitudinal sectional view of Fig. 2 taken on the line III—III thereof.
Figure 4:
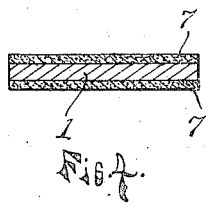
Fig. 4 is a cross sectional view of a modified form of gasket.
Figure 5:
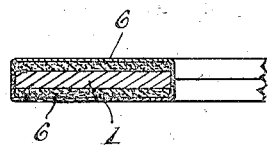
Fig. 5 shows another form of gasket.

Upon both faces of the metallic body 1 there is secured by cement or otherwise, a sheet of asbestos 2 or other suitable material, the sheet of asbestos being cut for matched relation with the faces of the metallic body 1. These yieldable or compressible sheets of material are covered by retaining or reinforcing sheets of extremely thin copper or malleable metal 3 and 4 which will readily conform under pressure to the inequalities of the block and head to form, with the compressible packing, a tight joint, and in Figs. 3 and 5 there are shown different ways of arranging and applying this copper reinforcement for the packing. In Fig. 3, the marginal edges of the gasket and its various apertures are shown as being bound in the usual manner, by edge portions 5 of the sheet 3 bent or folded against and over the exposed edges of the body 1, asbestos packing 2, and turned over or clenched down upon the margin of the upper sheet of copper 4. This copper surfacing is to protect the asbestos surface and prevent it from adhering to the cylinder head and block, and from fraying and becoming disintegrated along its edges, but without the metallic stiffening and strengthening body 1, the gasket has insufficient strength to withstand usage and the thin copper will crack, particularly at the narrow portions of the gasket and will disintegrate and cause leakage. In Fig. 5 there is shown two plates 6 as covering the asbestos with the marginal edges of the plates inbent so as to abut at their edges, and form a lining for covering the edges of the asbestos sheets and body at the gasket apertures and margin. In either instance, the copper plates or sheets protect the exposed edges of the sheets of the asbestos, as well as the outer surfaces thereof, preventing the edges from being flayed or worn and the surfaces from adhering to the engine head and block so that the gasket cannot be removed. To so face gaskets for this purpose with very thin copper, is common practice, and such facing may be used or not as desired, a construction being illustrated in Fig. 4, in which the gasket comprises a metallic reinforcing or stiffening body 1 faced with a suitable packing material 7 on each side, such as a cork composition which may be secured thereon by cement or by applying the composition under pressure and heat, thus causing the adhesive material contained in the composition to cement the layers to the metal body. A suitable graphite or other dressing may be applied to the outer surface of the packing sheets to prevent the gasket from adhering too firmly to the cylinder block and head. These layers or facings of composition are comparatively thin, but thick enough to yield and conform to the irregularities of the cylinder block and head, to pack the joint and prevent leakage, and as the metal body 1 lends strength and rigidity to the gasket, forming a backing for the packing material, said material is prevented from disintegrating in use and from becoming broken or cracked in handling.

Gaskets of a construction embodying the invention may be very cheaply and expeditiously manufactured, as a sheet of metal for forming the body 1 may have the packing material first applied to its surfaces by passing the same between heated rollers or in some other convenient manner, to cause the material to adhere firmly to the surfaces of the plate, and then punching out the gasket in a single operation, the metal and packing being simultaneously blanked out in a suitable press by means of dies. After the body with the packing applied thereto is thus formed, the facing of thin copper may then be applied in the usual manner if desired.

What I claim is:—

1. A gasket comprising a flat sheet metal body formed with openings to conform to cylinder and water passage openings of an engine cylinder block, compressible packing material adhesively applied to both faces of said metallic body and formed with openings corresponding to the openings in the body to provide compressible faces for and coextensive with the faces of the metallic body, and a thin metallic facing covering the outer faces of the packing and marginal edges of the packing and body and within the openings.

2. A gasket comprising a flat sheet metal body formed with openings to conform to cylinder and water passages, sheets of asbestos packing material adhesively applied to both faces of said metallic body and formed with openings to correspond with the openings in the body to provide compressible faces for and coextensive with the faces of the metallic body, and a thin metallic facing completely enveloping the body with the packing material applied thereto and covering all parts thereof within and without said openings.

3. A gasket comprising a flat stiffening metallic body formed with openings and narrow portions between the openings, sheets of asbestos packing material applied to the upper and lower faces of the body with openings corresponding to the openings in the body to provide compressible faces for and coextensive with the faces of the metallic body, and a thin copper sheathing applied to and covering the upper and lower exposed surfaces of the packing with marginal portions of the sheathing turned into the openings in the body and packing and over the marginal edges of the body and packing to cover all exposed edges both within and without the openings of the gasket.

4. A gasket for use in internal combustion engine service and comprising a flat sheet metal core, compressible facings therefor, the core and facings forming an embryo assembly, and a soft metal sheath overlying exposed faces of the assembly, said assembly having the core of unbendable material and the facings of a fibrous packing material co-extensive with the opposite faces of the core, said assembly having openings conforming in contour with those of the article faces with which the gasket is to co-operate, said sheath being of thin cross-section and applied to the assembly in a manner to overlie at least each of the exposed surfaces of walls of the openings, whereby each of the facings will be located between metallic elements with the core forming an unbendable support adapted to maintain the formation of the gasket in use.

In testimony whereof I affix my signature in the presence of two witnesses.

EMIL A. NELSON.

Witnesses:
 ANNA M. DORR,
 KARL H. BUTLER.